United States Patent [19]

Diesel et al.

[11] Patent Number: 4,652,482
[45] Date of Patent: * Mar. 24, 1987

[54] PROCESS FOR MAKING COLORED RESIN IMPREGNATED PAPER SHEETS WITH A THREE-DIMENSIONAL SURFACE STRUCTURE AND LAMINATES USING THE SHEETS

[75] Inventors: Hans-Dieter Diesel, Seligenstadt; Hans J. Schmidt, Haibach; Burkhard Sauer, Sulzbach, all of Fed. Rep. of Germany

[73] Assignee: Letron GmbH, Aschaffenburg, Fed. Rep. of Germany

[*] Notice: The portion of the term of this patent subsequent to Jul. 30, 2002 has been disclaimed.

[21] Appl. No.: 601,558

[22] Filed: Apr. 18, 1984

[30] Foreign Application Priority Data

Apr. 22, 1983 [DE] Fed. Rep. of Germany ....... 3314610

[51] Int. Cl.$^4$ .................. B32B 3/22; B32B 29/06; B05D 3/02; B05D 5/00
[52] U.S. Cl. .................. 428/151; 427/262; 427/264; 427/265; 427/288; 428/153; 428/172; 428/211
[58] Field of Search ............... 427/257, 262, 264, 258, 427/265, 288; 428/151, 211, 153, 172

[56] References Cited

U.S. PATENT DOCUMENTS

| 3,406,037 | 10/1968 | Pierce | 427/361 |
| 3,600,827 | 8/1971 | Fisher et al. | 434/84 |
| 3,811,915 | 5/1974 | Burrell et al. | 428/143 |
| 4,097,635 | 6/1978 | Hernández et al. | 428/172 |
| 4,151,315 | 4/1979 | Fock et al. | 427/258 |
| 4,169,907 | 10/1979 | Barker et al. | 427/264 |
| 4,532,157 | 7/1985 | Schmidt et al. | 427/262 |

FOREIGN PATENT DOCUMENTS

| 1937733 | 7/1970 | Fed. Rep. of Germany . |
| 2224732 | 12/1973 | Fed. Rep. of Germany . |
| 2357726 | 5/1975 | Fed. Rep. of Germany . |
| 2727312 | 12/1978 | Fed. Rep. of Germany . |
| 3024391 | 1/1982 | Fed. Rep. of Germany . |
| 3247677 | 6/1984 | Fed. Rep. of Germany . |
| 2251663 | 6/1975 | France . |

OTHER PUBLICATIONS

Europäischer Recherchenbericht (European Search Report), Application Ser. No. EP 84 10 4293, Aug. 10, 1984, Den Haag.

Primary Examiner—Evan K. Lawrence
Attorney, Agent, or Firm—Mandeville & Schweitzer

[57] ABSTRACT

A process for the production of colored films of paper impregnated with synthetic resin which contain melamine resin and have a three-dimensional surface structure, by printing the paper films with a colored pattern using an aqueous protein-based printing ink and lacquering thereover. The color which is printed in the regions in which the lacquer layer is to be thinner than in the other regions contains a lacquer repellent, and the printed and dried paper film is impregnated with an aqueous impregnation of a melamine resin from the unprinted side, with the formation of a one-sided excess of resin, and is dried. The printed and impregnated film is coated on the printed side with an aqueous lacquer based on melamine resins, and the lacquered film is hardened at elevated temperature without applying pressure. A laminate is produced by joining the unprinted side of the hardened film to a substrate such as chipboard.

6 Claims, No Drawings

PROCESS FOR MAKING COLORED RESIN IMPREGNATED PAPER SHEETS WITH A THREE-DIMENSIONAL SURFACE STRUCTURE AND LAMINATES USING THE SHEETS

This invention relates to a process for the production of colored films of paper impregnated with synthetic resin which contain melamine resin and have a three-dimensional surface structure, by printing the paper films with a pattern and lacquering thereover. An aqueous printing color is used in the process, and the printing color which is printed in the regions in which the lacquer layer is thinner than in the other regions contains a lacquer repellent.

Another aspect of the invention is a laminate made from the colored film produced by the process of the invention.

U.S. Pat. No. 3,811,915 describes a process for the production of colored films of resin-impregnated paper which have a three-dimensional surface structure, by printing the paper films with a pattern and lacquering thereover, and the printing color which is printed in the regions in which the lacquer layer is thinner than in the other regions contains a lacquer repellent. DE-A No. 3,247,677 describes an improved process of this type, according to which an aqueous printing color is used, the printed film is dried, coated with an aqueous lacquer having a viscosity of from 15 to 40 sec. in an AK-4 beaker, which lacquer essentially contains as binder a mixture of (A) a mixture of a urea resin and/or melamine resin dissolved in water and an aqueous acid as hardener which hardens in less than 100 sec. at 100° after mixing the aqueous resin solution with the acid, and (B) a binder selected from the group of (a) water-dilutable polyester resin, (b) acrylate resin and (c) ethoxylated glycerine derivative, and from 10 to 250 parts by weight of solid binder (B) are allotted to 100 parts by weight of solid binder (A), and the lacquered film is hardened under the effects of air heated to a temperature above 100°, without applying pressure. By this process, it is possible to produce films, the surface of which is hardly distinguishable from that of natural wood. However, the pore formation is often not completely satisfactory, because when the film is pressed together with the substrate, the melamine resin on the surface of the paper film seeps out and covers to some extent the areas containing the lacquer repellent, so that the pore formation is not sufficiently pronounced.

An object of the present invention is to avoid these disadvantages and to provide a process for the production of the initially described films, in which process clearly visible pores are formed. Another object of the present invention is to use films produced by the process of the invention to form laminates which have an excellent joint formed by the films when pressed together with substrates under the conditions of the melamine-short cycle process.

Thus, this invention relates to a process and to a laminate using the product produced thereby.

The paper films are printed with a pattern, as is the case according to the prior art. If only a two-colored pattern is desired, it is sufficient for the paper film which is in one of the desired colours to be printed with a pattern in the other color. However, it is also possible to produce multi-coloured films of resin-impregnated paper by printing the films with several colors in succession to achieve the desired pattern. In either case, the last color must be printed in the regions in which the lacquer layer of the finished film is thinner than in the other regions. To achieve this, the color which is printed on last must contain a lacquer repellent. Lacquer repellents may be polysiloxanes based on silicone resins and silicone fluids, as described in the above-mentioned references. Lower alkyl silicones such as dimethyl- and diethyl silicone are specific examples. Examples of such trade products are "Dri-Film 1040," manufactured by General Electric and "Silikonefluid 1107," manufactured by Dow Corning (registered trademark). It is also possible to use lower alkyl silicones which contain a certain number of phenyl groups, or ester waxes (waxes based on crude montan wax).

As a result of the content in the color printed on last of such lacquer repellents, when the lacquer is applied in the appropriate manner described above, it is rejected in the areas printed with this color and is therefore present in a thinner layer than in the other areas. In this manner, a clearly three-dimensional surface structure, of the type found on a wood surface (veneer), is obtained on a film of resin-impregnated paper which has a smooth surface. When the resin-impregnated paper films according to this invention are printed with a wood pattern, it is virtually impossible to distinguish them from an artificial wood veneer. An essential feature of the present process comprises printing the paper film with an aqueous gravure ink based on protein. The term "aqueous" is understood as meaning that the liquid phase substantially consists of water. Up to about 30% by volume, preferably up to 20% by volume and more preferably up to 10% by volume, based on the total quantity of the liquid phase, of aliphatic monohydric or polyhydric alcohols may be contained in the printing colour as solubiliser. Examples include methanol, ethanol, ethyl glycol, propyl alcohols and glycerine etc. Ethanol and ethyl glycol or a mixture thereof are preferred, and in the case of a mixture of ethanol and ethyl glycol, the proportion of ethyl glycol appropriately amounts to about 10 to 40% by volume, preferably about 15 to 30% by volume.

The printing color contains an organic binder. Casein is a preferred binder. The printing color also naturally contains the desired color-providing pigments and optionally the above-mentioned additives in terms of lacquers, such as silicone resins or silicone fluids and specific waxes.

Another essential feature of the present process comprises drying the printed resin-impregnated paper film. It may thus be stored for a comparatively long period of time, i.e. for weeks, months or even years. Further processing may then be carried out in any place or at any time in an installation suitable for this purpose.

The printed and dried paper film is then impregnated from the unprinted side immediately or, as mentioned above, after some time, optionally in a different work place, with an aqueous impregnating solution of a melamine resin having a viscosity of from 15 to 30 secs. in an AK-4 beaker, for example by means of an abrasion roller, with the formation of a one-sided excess of resin on the unprinted side, and is dried to a dryness value of from 4.0 to 9.0 under the effect of object temperatures of more than 100°.

The film is preferably dried to a dryness value of at least 4.5. The upper limit of the dryness value is preferably 8.0. This value is determined as follows. A sample having dimensions of 10 cm × 10 cm = 100 cm² is cut out of the dry, impregnated film and is weighed on an analytical balance having an accuracy of ±1 mg. (Weighing should be carried out as soon as possible after the sample has been taken, because the product is a hygroscopic precondensate which absorbs water in the course of time). After being weighed, the sample is dried for five minutes at 160° C. in a drying chamber, cooled in a dessicator and then re-weighed. The difference between the weighing-in value and the re-weighing value, multiplied by 100 and divided by the re-weighing value gives the dryness value in percent.

The paper film may be dried in, for example a float dryer at a maximum circulating air temperature of 200° C. The upper temperature limit should preferably be 160° C. A temperature curve rising from 120° to 160° C. is appropriate in the float dryer. However, the film may also be dried by means of infrared radiators. If the paper is dried to the above-mentioned dryness value, it may be wound up without sticking to itself. However, it is still not completely hardened.

The quantity of melamine resin which is applied may be controlled by suitable mechanical devices, for example by a doctor. From 60 to 100 parts by weight of resin (solids) are preferably applied to 100 parts by weight of paper. At least 70 parts by weight of resin are more preferably applied. The upper limit is appropriately 90 parts by weight.

The film may be impregnated with melamine resin at a rate of from 10 m/min to 50 m/min.

Optionally modified melamine-formaldehyde impregnating resins which are available commercially may be used as the melamine resin, as they may be obtained, for example under the registered trademarks Madurit MW 559 or Madurit MW 484. The impregnating resin solutions have a solids content of from about 50 to 65% by weight, preferably from about 55 to 60% by weight (measured by heating for one hour to 120° C. in a drying chamber in a small glass cup according to DIN 12605). It is possible to shorten the hardening time, in particular in the case of large-scale production, by adding hardeners conventional for melamine-formaldehyde impregnating resins. Pot times of from 8 to 24 hours at room temperature are acceptable. The temperature of the impregnating solution should not be above 35° C. and preferably not above 30° C. Higher temperatures may greatly shorten the pot times and may thus disrupt the stability of the impregnating solution.

However, according to the present invention, the melamine resin may also be used for impregnation without a hardener, so that is retains a long reactivity in the impregnated paper film. Surprisingly, a complete and satisfactory hardening still takes place during compression by the direct coater. Apparently, the hardening of the resin is co-catalysed by the hardener which is contained in the cover lacquer and which passes through the paper film to the impregnating resin which is applied to the lower side of the film, and which also penetrates inside the paper film. It is possible that a particularly good join is also obtained between the cover lacquer and the impregnating resin applied to the back because of these circumstances. The paper does not split apart.

The film which is impregnated and dried in this manner may also be stored for a comparatively long period of time, easily up to 6 months, under storage conditions of from 50 to 70% air humidity and at from 20° to 25° C., before it is further processed. This is a particular advantage, because it is possible to further process films which have been treated up to this stage in different ways at desired times. However, it is also possible to carry out the next procedural step immediately.

Thereafter, the printed and impregnated film is coated on the printed side with an aqueous lacquer having a viscosity of from 15 to 40 sec. in an AK-4 beaker, which lacquer essentially contains as binder a mixture of (A) a mixture of a melamine resin dissolved in water and an aqueous acid as hardener which hardens in less than 100 sec. at a temperature above 100° C. after mixing the aqueous resin solution with the acid, and (B) a binder selected from the group of (a) water-dilutable polyester resin, (b) acrylate resin and (c) ethoxylated glycerine derivative, and from 10 to 250 parts by weight of solid binder (B) are allotted to 100 parts by weight of solid binder (A).

The film may be lacquered at a rate of from 10 m/min to 50 m/min. Since the lacquering rate may be the same as the impregnating rate, it is possible to carry out one step of the process immediately after the other in one installation, after intermediate drying.

An aqueous lacquer according to the definition given above is used for lacquering. The essential feature of the present process in this context resides in the use of an aqueous lacquer. Here again, as already mentioned in connection with the printing colour, it is possible for the aqueous lacquer to contain small quantities, preferably up to 20% by volume, and more preferably up to 10% by volume of organic solvents as solubilisers. Ethanol, glycols and methoxybutanol are suitable organic solvents for the lacquer.

It is important for the aqueous lacquer to have a processing viscosity within the range of from 15 to 40 sec. in an AK-4 beaker, preferably from 22 to 30 sec. The viscosity is determined in an AK-4 beaker at 20° C. according to DIN 53 211.

The melamine resin defined under (A) is an essential binder component. Commercially available aqueous solutions of such resins are concerned here. Examples of such trade products are the following:
(1) Maprenal MF900=non-plasticized hexamethoxy methyl melamine resin (Hoechst AG) (registered trademark)
(2) Maprenal MF920=highly reactive, non-plasticized melamine resin (Hoechst AG) (registered trademark)
(3) Methanol-etherified melamine resins of the Luwipal series (BASF) (registered trademark)

Melamine resins of this type may be hardened in a known manner with an aqueous acid, as is known to those skilled in the art. Organic and inorganic acids may be used. Examples of organic acids include p-toluene sulphonic acid or blocked p-toluene sulphonic acid. Phosphoric acid is an example of a suitable inorganic acid.

It is important for the mixture of melamine resin dissolved in water and the hardener acid to have a long pot time at room temperature (about 4 to 8 hours) and a short pot time at a higher temperature. Thus, at a temperature above 100° C., the catalysed lacquer mixture must harden in less than 100 seconds, appropriately in less than 80 seconds and preferably in less than about 60 seconds.

In order to achieve a good three-dimensional effect, it is necessary for the lacquer to contain the above-described component (B) as binder in the quantity specified above. At least about 10 parts by weight, and preferably at least about 20 parts by weight of binder (B) are used per 100 parts by weight of solid binder (A). On the other hand, the upper limit for the quantity of binder (B)

is appropriately 250 parts by weight, preferably 150 parts by weight.

The trade products (registered trademarks) stated below are examples of the binders defined under B):

(a) water-dilutable polyester resin
   Worleepol V 808-water-dilutable, low viscosity, highly reactive polyester resin (Worlee-Chemie GmbH)
(b) acrylate resin
   Acronal 240D-aqueous plasticizer-free dispersion of a thermally cross-linkable copolymer based on an acrylate and styrene (BASF).
(c) ethoxylated glycerine derivative
   plasticizer 9-oxethylation product of glycerine (BASF).

In addition to the binders, the lacquer contains suitable additives in terms of lacquers, such as plasticizers, matting agents, antifoaming agents and sedimentation inhibitors, as known to those skilled in the art.

The lacquer contains from about 40 to 60% by weight of solid binder. It is appropriately applied in a quantity of from 10 to 50 g of lacquer solution per square meter of resin-impregnated paper film, and preferably in a quantity of 20 to 30 g/square meter.

Immediately after being lacquered, the film is hardened under the effect of object temperatures of more than 100° C. The upper temperature limit for the hot air is determined by the prevention of undesirable properties which are conventional in the lacquer field, such as bubbles forming and the lacquer running.

The film is appropriately dried in a float dryer, the temperature of the hot air rising to about 160° C.

However, it is also possible to use infrared radiators to dry the film. It is dried to a dryness value of from 3.5 to 6.5, preferably to a value of 5.5.

In the case of difficult decorations, immediately after the lacquer has been applied and before the film is heated to a temperature above 100° C., the unprinted side of the film may be passed over a heated roller which has a surface temperature of from 60° to 100° C. The roller surface temperature is appropriately at least about 80° C. This variant of the process promotes the formation of the pores.

The film which is produced according to the present invention may be stored for a long time, easily up to 6 months, under storage conditions of from 50 to 70% air humidity and at from 20° to 25° C., and may be delivered in this form to direct coaters, i.e. to manufacturers of coated chipboard and the like. During the last compression stage of the chipboard under pressure and under the effects of temperature, the direct coater may press the film produced according to this invention together with the chipboard to form a laminate. Pressures of from 15 to 20 kp/cm$^2$ and temperatures of from 140° to 160° C., measured on the resin-impregnated paper are appropriately applied during a time of from 1 to 2 minutes, as is known in the chipboard field in the multi-stage-short cycle process. The chipboard and the film produced according to this invention harden under these temperatures, and at the same time, the film is firmly joined to the chipboard or to any other substrate which is used by means of the melamine resin which is applied to the back. This is appropriately carried out without recooling.

It is surprising that during the production of the film according to the present invention, a join is produced between the melamine resin which is applied to the back of the paper and which has penetrated inside the paper, and the lacquer layer which is applied to the top, without the lacquer layer being adversely affected by water which is produced during the condensation reaction of the melamine resin, or by other vapours (formaldehyde which is released). It is also surprising that the cover lacquer recedes in the areas of the printing colour and becomes sufficiently liquid during the subsequent compression by the direct coater in order to combine with the melamine resin inside the paper, although it is not so liquid that it flows over the printing colour, as is sometimes the case in the initially described process.

One particular advantage of the present process is that films of resin-impregnated paper which have outstanding mechanical and chemical properties may be obtained from very thin paper films. According to this invention, paper films which have a square meter weight of from 30 to 250 grams may be used. So-called laminate papers may be used which have not yet been impregnated with any synthetic resins.

Laminate papers which are smooth on one side and are printed on this smooth side may also be used. The three-dimensional surface structure is particularly obvious on the smooth side. On the other hand, the rougher side allows a better join with the substrate to which the resin-impregnated paper films are applied.

The present invention will be described in the following Examples. The stated quantities relate to parts by weight, unless otherwise indicated.

EXAMPLES OF PRINTING COLORS

|  | Parts by weight |
|---|---|
| Printing color I | |
| Heliogen blue 7081-D (BASF) | 12.9 |
| Neocryl BR-24 (Polyvinyl Chemie) | 19.2 |
| Neocryl AP-2860 (Polyvinyl Chemie) | 0.2 |
| DMAMP (I.M.C.) | 1.6 |
| Water | 18.2 |
| Neocryl BT-22 (Polyvinyl Chemie) | 40.0 |
| Aquacer 502 (Cera Chemie) | 4.9 |
| Printing color II | |
| Aqueous printing color, analogous to color I, but color light brown. | |
| Printing color III | |
| Aqueous printing color analogous to color I, but color dark brown. | 97 |
| Wax KSE solution (Hoechst AG) | 3 |

EXAMPLES OF MELAMINE IMPREGNATING SOLUTIONS

|  | Parts by weight |
|---|---|
| Melamine impregnating solution I | |
| Madurit MW 559 | 54.74 |
| Water | 44.88 |
| Madurit hardener MH 835 | 0.11 |
| Hypersal XT 790 (wetting agent) | 0.27 |
| Melamine impregnating solution II | |
| Madurit MW 484 (58% aqueous solution) | 120.0 |
| Madurit hardener MH 835 | 0.1 |
| Hypersal 793 (wetting agent) | 0.3 |
| Melamine impregnating solution III | |
| Madurit MW 484 (58% aqueous solution) | 120.0 |
| Hypersal XT 793 (wetting agent) | 0.3 |

EXAMPLES OF LACQUER SOLUTIONS

| | Parts by weight |
|---|---|
| Lacquer I, silk gloss | |
| Maprenal MF 920/95% (Hoechst AG) (melamine resin) | 62.1 |
| p-toluene sulphonic acid/50% in water | 5.0 |
| Acronal 240D/40% (BASF) (Acrylate resin) | 15.0 |
| 1,6-hexanediol/80% (BASF) | 12.0 |
| Syloid 166 (Grace) (Silica-based matting agent) | 2.5 |
| Paste Bentone EW/5% (Kronos Titan) | 1.25 |
| Methoxybutanol (Hoechst AG) | 3.0 |
| Surfynol TG (Air Products USA) (Pigment wetting agent) | 0.5 |
| Solution Etingal A/10% (BASF) (Antifoaming agent based on phosphoric acid ester) | 0.75 |
| Lacquer II, silk mat | |
| Maprenal MF 900/95% (Hoechst AG) | 32.0 |
| p-toluene sulphonic acid/50% in water | 5.0 |
| Plasticizer 9 (BASF) | 26.0 |
| Paste Bentone EW/5% (Kronos.Titan) | 2.0 |
| Syloid 166 (Grace) (Silica-based matting agent) | 4.0 |
| Water | 14.0 |
| Ethanol | 6.0 |
| Solution Etingal/10% (BASF) (Antifoaming agent based on phosphoric acid ester) | 2.0 |
| Worleepol V 808 | 14.0 |

EXAMPLE 1

A commercially available paper weighing 60 g/m$^2$ is printed with a wood grain pattern in the direct gravure printing process using the printing color II in the first inking system, and then dried. The film which is printed in this manner is printed in the second inking system with printing color III which contains a lacquer repellent. This color is printed only in the areas in which a pore formation is to be produced. This color is inked in more heavily than printing color II. Thus, printing color III has basically the same composition as printing color II, but with the modifications described above.

The paper film printed in this manner is impregnated immediately or after several months, for example 2 months, with the melamine resin impregnating solution I from the back, a resin application of 80 g of solid resin per 100 g of paper being adjusted using a doctor. The coated film is dried in a suspension drier, and the temperature of the circulating air is about 100° C. at the inlet and about 140° C. at the outlet. The residence time in the suspension drier amounts to about 60 seconds. A dryness value of about 5.5 is obtained. The film is impregnated with resin at a rate of 30 m/min.

After two months, the paper film printed in this manner is coated with 12 g/m$^2$ of lacquer solution I on the printed surface on a conventional paper lacquering machine, a round doctor being used to adjust the quantity which is applied. The lacquered film is passed through a drying channel in which the air temperature rises from 100° C. at the inlet to 150° C. at the outlet. The residence time in the drying channel is about 40 seconds.

EXAMPLE 2

A paper is used for printing which weighs 90 g/m$^2$ and is commercially available under the name glazed resin-impregnated paper manufactured by PWA Dekor Gmbh & Co. This paper is printed as described in Example I. The printed paper is impregnated with the melamine resin impregnating solution III as described in Example I, and then dried. A quantity of 90 g of solid melamine resin is applied per 100 g of paper.

This film is lacquered as described in Example I, it being possible to use lacquer solution I or lacquer solution II.

EXAMPLE 3

A laminate paper weighing 130 g/m$^2$ is used, as may be obtained from the firm Holtzmann & Cie. AG. This paper is produced as a four color print. The first three printing colors have the same composition as printing color I, but they have different color positions and do not contain the last mentioned component wax KSE solution. Printing color III which is modified with ester wax is applied as the last printing color in the fourth inking system, i.e, after colors 1 to 3 have dried, and then it is also dried.

The printed paper is impregnated with the melamine resin impregnating solution II from the back after two months, as described in Example 1 or 2, a quantity of 70 g of solid resin per 100 g of paper being applied.

Lacquer II (silk mat) is used for lacquering the paper.

The quantity of lacquer which is applied amounts to 15 g of binder of the lacquer per square meter of the paper film. The film which is provided with the lacquer application is then immediately passed over a heated roller having a surface temperature of 90° C. The film is then passed through a drying channel which has a temperature profile rising from 80° C. to 170° C., the residence time amounting to 40 seconds.

What is claimed is:

1. Process for the production of colored films of paper having a three-dimensional surface structure, comprising
   (a) impregnating, from the unprinted side, paper sheets which were printed on one side with a pattern using an aqueous protein-based gravure printing ink including a lacquer-repelling material in those regions where the lacquer coating is to be thinner than in other regions and was dried, with an aqueous impregnating solution of a melamine resin having a viscosity of 15 to 30 seconds in the AK-4 beaker at 20° C. determined according to DIN 53 211, with the formation of a one-sided excess of said resin on the unprinted side;
   (b) drying the impregnated sheet to a dryness value of from 4.0 to 9.0 under the effect of object temperatures of more than 100° C.;
   (c) coating the impregnated and dried paper sheet on the printed side with an aqueous lacquer having a viscosity of 15 to 40 seconds in an AK-4 beaker at 20° C., determined according to DIN 53 211, said aqueous lacquer essentially containing as binder a mixture of
   (A) a mixture of melamine resin dissolved in water and an aqueous acid as a hardener which hardens in less than 100 seconds at a temperature above 100° C. after mixing the aqueous resin solution with the acid, and
   (B) a binder selected from the group consisting of
      (i) water-dilutable polyester resin,
      (ii) acrylate resin, and
      (iii) ethoxylated derivative of glycerine, there being 10 to 250 parts by weight of solid binder (B) for every 100 parts by weight of solid binder (A); and (d) curing the lacquered sheet without pressure by the action of air heated to above 100° C.

2. A process according to claim 1 characterized in that in step (a), a quantity of resin of from 60 to 100 parts by weight is applied to 100 parts by weight of paper.

3. A process according to claim 1, characterized in that immediately after the lacquer has been applied and before hardening, the unprinted side of the film is passed over a heated roller having a surface temperature of from 60° to 100° C.

4. A process for the production of a colored, lacquer coated film of paper impregnated with synthetic resin, which film contains melamine resin and has a three-dimensional surface structure, by printing the paper film on one side with a colored pattern using an aqueous protein-based gravure printing ink including a lacquer-repelling material in those regions where the lacquer coating is to be thinner than in other regions, whereby said film has a printed side and an unprinted side, drying the printed film, impregnating it and lacquering thereover, characterized in that the process comprises (a) impregnating the printed and dried paper film with an aqueous impregnating solution of a melamine resin having a viscosity of from 15 to 30 sec. in an AK-4 beaker at 20° C. according to DIN 53 211 from the unprinted side, with the formation of a one-sided excess of resin on the unprinted side;

(b) drying the impregnated film to a dryness value of from 4.0 to 9.0 under the effect of object temperatures of more than 100° C.;

(c) coating the printed, impregnated and dried film on the printed side with an aqueous lacquer having a viscosity of from 15 to 40 sec. in an AK-4 beaker at 20° C. according to DIN 53 211, essentially containing as a binder a mixture of (A) a mixture of melamine resin dissolved in water and an aqueous acid as a hardener which hardens in less than 100 seconds at a temperature above 100° C. after mixing the aqueous resin solution with the acid, and (B) a binder selected from the group consisting of
(i) water-dilutable polyester resin,
(ii) acrylate resin, and
(iii) ethoxylated glycerine derivative, there being from 10 to 250 parts by weight of solid binder (B) alloted to 100 parts by weight of solid binder (A); and (d) hardening the lacquered film under the effect of object temperatures of more than 100° C.

5. A laminate a substrate joined to the unprinted side of the film produced by the process of claims 1 or 4.

6. A laminate according to claim 5 wherein said substrate is chipboard.

* * * * *